(12) United States Patent
Washburn

(10) Patent No.: US 6,467,019 B1
(45) Date of Patent: Oct. 15, 2002

(54) METHOD FOR MEMORY MANAGEMENT IN TERNARY CONTENT ADDRESSABLE MEMORIES (CAMS)

(75) Inventor: James Washburn, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/436,055

(22) Filed: Nov. 8, 1999

(51) Int. Cl.[7] .............................................. G06F 12/00
(52) U.S. Cl. ........................ 711/108; 711/128; 711/206; 365/49; 365/168; 365/189.07
(58) Field of Search ................................. 711/108, 128, 711/202, 206, 207, 158; 365/49, 168, 189.01, 189.07

(56) References Cited

U.S. PATENT DOCUMENTS 5,920,886 A * 7/1999 Feldmeier .................... 711/108
6,137,707 A * 10/2000 Srinivasan et al. ........... 365/49

* cited by examiner

*Primary Examiner*—Do Hyun Yoo
*Assistant Examiner*—Jasmine Song

(57) ABSTRACT

According to one embodiment (300) a ternary CAM can include rules stored in CAM locations, where each rule includes match criteria. CAM locations determine priority among various rules. An input value can be matched against stored rules according to the match criteria. In an update operation (300) the CAM can receive a new rule (302). The new rule can be checked for overlap against currently stored rules (304). Rules overlap if an input value exists that can match both rules. If the new rule does not overlap any other rules, it can be added to any free location in the CAM. If the rule overlaps one or more existing rules, the new rule can be stored in an available location that with the appropriate priority with respect to the stored overlapping rules. If no such available location exists, a new set of CAM locations can be randomly selected, and the new rule and all overlapping rules can be written into the selected locations according to priority value.

24 Claims, 8 Drawing Sheets

| QUERY | | | |
|---|---|---|---|
| 1100 1110 | 0000 0110 | 1100 1011 | 1100 1110 |

| rule a | 1100 1110 | 0000 1111 | 1100 10XX | XXXX XXXX | (PRIORITY=4) |
|---|---|---|---|---|---|
| rule b | 1100 1110 | XXXX 0110 | 1100 1011 | 11XX XXXX | (PRIORITY=6) |
| rule c | 1100 1110 | 0000 0110 | 1100 1011 | 1100 11XX | (PRIORITY=1) |
| rule d | 1100 1110 | 0001 0110 | 1100 1011 | XXXX XXXX | (PRIORITY=9) |
| rule e | 1100 1110 | 000 0110 | 1100 1011 | 1100 XXXX | (PRIORITY=3) |
| rule f | 1100 1110 | XXXX 0110 | 1100 1111 | 1100 XXXX | (PRIORITY=5) |
| rule g | 1100 1110 | 0000 0110 | 0000 1011 | 1100 XXXX | (PRIORITY=5) |
| rule h | 1100 1110 | 0000 1111 | 1111 1011 | 1100 1101 | (PRIORITY=5) |

| (DATA a) | 1100 1110 | 0000 1111 | 1100 1011 | 1110 0111 |
|---|---|---|---|---|
| | + | | | |
| (MASK a) | 1111 1111 | 1111 1111 | 1111 1100 | 0000 0000 | rule a

Allocate G CAM locations, randomly selected over the entire range of possible CAM address locations. G=number of nodes in graph. Assign each node in graph a CAM location, with nodes ordered in monotonically decreasing order of priority, assign locations in monotonically increasing order of address.
Write all rules to CAM address locations.

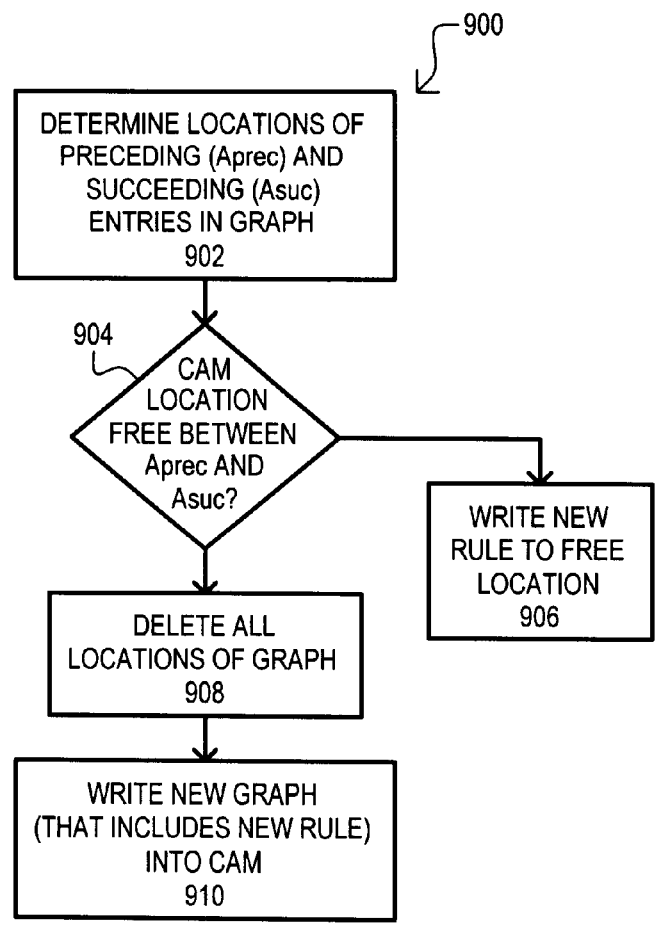

FIG. 9

Find CAM address locations associated with nodes which are
   the predecessor and successor to the node corresponding
   to Rule that is being inserted (Aprec and Asucc)
Allocate randomly selected free CAM location at address
   between Aprec and Asucc (Anew)
If such location is available
   Write Rule at location Anew
Else
   Delete all existing members of graph from CAM
   Insert entire graph (with new node) into CAM

FIG. 10

```
Inputs: Rule A, Rule B (Both rules of length N)
Output: boolean value which is true if Rules
    Overlap, false otherwise
Overlap:=true;
Bit:=0;
while ((Bit<N)&&Overlap)
{
    if ((A[Bit]!=B[Bit]&&(A[Bit]!=X)&&(B[Bit]!=X))
        Overlap := false;
    Bit := Bit+1
}
```

| RULE NO. | RULE | DIFFERENCE |
|---|---|---|
| 1 | 1000 1100 | 1111 1111 |
| 2 | 1000 1101 | 0000 0001 |
| 3 | 1111 0001 | 0111 1100 |
| 4 | 1111 0010 | 0000 0011 |

FIG. 13A

| RULE x |
|---|
| 1000 1100 |

| RULE NO. | RULE | DIFFERENCE | MATCH |
|---|---|---|---|
| 1 | 1000 1100 | 1111 1111 | 1111 0001 |
| 2 | 1000 1101 | 0000 0001 | 1111 0000 |
| 3 | 1111 0001 | 0111 1100 | 1000 1100 |
| 4 | 1111 0010 | 0000 0011 | 1000 1111 |

FIG. 13B

| RULE y |
|---|
| 111X 0010 |

| RULE NO. | RULE | DIFFERENCE | MATCH |
|---|---|---|---|
| 1 | 1000 1100 | 1111 1111 | 1001 0001 |
| 2 | 1000 1101 | 0000 0001 | 1001 0000 |
| 3 | 1111 0001 | 0111 1100 | 1111 1100 |
| 4 | 1111 0010 | 0000 0011 | 1111 1111 |

FIG. 13C

| LOCATION | DATA |
|---|---|
| 0 | A |
| 1 | B |
| 2 | C |
| 3 | D |

FIG. 14A (PRIOR ART)

| LOCATION | DATA |
|---|---|
| 0 | A |
| 1 | B |
| 2 |  |
| 3 | C |
| 4 | D |

FIG. 14B (PRIOR ART)

| LOCATION | DATA |
|---|---|
| 0 | A |
| 1 | B |
| 2 | Y |
| 3 | C |
| 4 | D |

FIG. 14C (PRIOR ART)

METHOD FOR MEMORY MANAGEMENT IN TERNARY CONTENT ADDRESSABLE MEMORIES (CAMS)

TECHNICAL FIELD

The present invention relates generally to content addressable memories (CAMs), and more particularly to methods for updating search tables in CAMs.

BACKGROUND OF THE INVENTION

One type of device that has found wide application in the field of networking is the content addressable memory (CAM). Many networking applications can require a match function. To perform a typical match function, a CAM can include a number of entries that store data values. The data values stored in a CAM may be conceptualized as a "table." Each data value can include match criteria that can be considered a "rule."

An input value (a query or comparand) can be applied to the CAM and essentially simultaneously with the table of rules. If a rule matches the query a match indication can be generated. Typically, a CAM can include a priority encoder to select from among multiple match indications. Conventionally, a priority encoder establishes priority according to the data value position within a CAM. Data value position is typically a CAM address.

In the field of networking, CAMs can be used to process network packets. Network packets can include a header with a number of data fields. Selected data fields can be extracted from a header and applied to a CAM. The CAM can compare an extracted data field with its table data values essentially simultaneously. If a header field matches a data value within the CAM, a match indication can be generated. A CAM match indication can generate associated data that can be used to process a packet.

As but a few of the many applications, a CAM can be used to in route forwarding. According to match indications provided by the CAM, a packet can be transmitted from one network node to the next. A CAM may also be used in packet filtering. Match indications (or lack thereof) can be used to prevent a packet from being allowed into, or transmitted from, a network. Still further, a CAM can be utilized to establish flow classification. Match indications can be used to direct packets along particular predetermined data flow routes.

By providing rapid, parallel matching of data values to an applied input value (a comparand), a CAM can provide a rapid matching function.

CAMs can include binary CAMs and ternary CAMs. A conventional binary CAM can compare data values of fixed size to comparand values of the same size. While useful for straightforward match functions, conventional binary CAMs cannot provide more complex match functions. In particular, it is often desirable to provide a match function between a comparand value and portions of a data values within a table. These and other more complex matching functions can be accomplished with a ternary (or "tertiary") CAM.

A ternary CAM can store data values that can be "masked." In a conventional ternary CAM, data values can be masked on a bit-by-bit basis. Thus, a valid ternary CAM entry can include masked and unmasked bits. Conventionally, an unmasked bit can be a "1" or "0" that is compared to the 1 or 0 of a comparand bit to generate a bit match or no match. A masked bit, often identified as "X," will provide a bit match regardless of its corresponding comparand bit value.

By masking a trailing portion of a data value, a conventional ternary CAM can provide a longest prefix match function. By masking various non-contiguous portions of a data value, a ternary CAM can provide a masked prefix match function. Longest and masked prefix matching can be important operations in a network hardware device.

A conventional ternary CAM, as noted above, can include a priority encoder that establishes priority according to position within a CAM.

While CAM priority encoders can allow for rapid match functions, such arrangements can have drawbacks. If data values stored in a CAM table remained static, matching functions could be undertaken without interruption and at high speed. Unfortunately, in most networking applications CAM data values can be continuously updated. As just a few examples, the data values in a route forwarding CAM may frequently change due to shortest path calculations of a routing protocol. Further, routers and/or switches in a network may be added or deleted, requiring a table update operation. Conventionally, if a new data value is added to a CAM, the new value must be placed within the CAM between those entries having a higher priority and those entries having a lower priority.

An example of a conventional CAM match and update operation will now be described. Referring now to FIGS. 14A to 14B, a portion of a CAM table is set forth in a sequence of diagrams.

FIG. 14A illustrates a CAM table prior to an update operation. The CAM table includes four locations, 0 to 3, that store data values A to D. In the arrangement of FIG. 14A it is assumed that priority is established according to lowest location. Thus, if an applied comparand value indicates a match with data value A and data value D, the match with data value A will have priority.

FIGS. 14B and 14C shown an update operation to the CAM table. The update operation includes the addition of a data value "Y" having a priority that is less than data values A and B, but greater than data values C and D. As shown by FIG. 14B, in order to ensure data value Y will have the desired priority, data values C and D must be moved to locations of lower priority. Thus, data values C and D are moved to locations 3 and 4, respectively. As shown by FIG. 14C, by moving data values of lesser priority, the new data value Y can be written into location 2.

CAM densities continue to increase. Currently, CAMs can include as many as 512 k entries. As densities increase CAMs may include millions of entries. Thus, conventional approaches to updating such large tables can be impractical. First, update operations for very large tables can consume processing resources. For example, if a CAM is utilized in conjunction with a central processing unit (CPU), the numerous copying operations required for some update operations can tie up the system CPU slowing down input/output operations in the system. Such slowdowns can be exacerbated because CAM data cannot typically be cached.

Conventional CAM update operations can also impact network device performance. For example, a router and/or network switch that includes a CAM can receive packets on a continuous basis. However, within a conventional CAM, the data and/or control paths that are used to perform a match function are not separate from those used to perform an update operation. Consequently, update operations of a CAM can prevent match functions from taking place, slowing down a network device's performance.

Nonconventional CAMs can include an intrinsic "block move." A block move can allow a CAM to move data values without taxing CPU resources. Unfortunately, including block move capabilities in a CAM can add to the complexity and/or cost of a CAM. Further, while a block move can free CPU resources, update operations may still interfere with match functions.

It would be desirable to provide some way of managing data values within CAM that does not include the drawbacks of conventional arrangements. Such a method could preferably be used in conjunction with conventional ternary CAMs.

SUMMARY OF THE INVENTION

According to one embodiment, a CAM can receive input values as queries. Various entries within the CAM can be conceptualized as including a matching rule and a priority. A method for updating entries in a CAM can include determining if a new entry overlaps any existing rules in the CAM. Rules can overlap if a query exists that can results in a match to both rules. In the event there is no overlap between a new rule and existing rules, the new CAM entry can be written into a free location within the CAM.

According to one aspect of the embodiments, existing rules that overlap can be arranged into a graph group within the CAM. A graph group can indicate a particular order for the rules within the CAM according to priority. If a new rule overlaps an existing rule within a graph group, a preceding and succeeding rule can be determined according to the priority of the new rule and the priority of the existing rules in the group. If one or more free locations exist between the locations storing the preceding and succeeding rules, the new rule can be written into such a free location.

According to another aspect of the embodiments, if no free locations exist between the locations storing the preceding and succeeding rules, the rules for the entire group can be erased and then rewritten into the CAM as a new group that includes the new rule.

According to another aspect of the embodiments, if a new rule overlaps existing rules within two or more graph groups, the two graph groups can be merged into a single graph group that includes the new rule.

According to another aspect of the embodiments, rules can include a number of bit locations that can have a "1" value, "0" value, and an "X" value, where an X value will match either a 1 or 0 value. Overlaps between a new rule and existing rules can be determined by comparing various bit locations of the new rule with corresponding bit locations of existing rules. If a corresponding bit location stores different values, and one of the values is not an X value, the rules do not overlap. If all corresponding bit locations store the same values, or if corresponding bit locations store different values but one of the different value is an X value, there is an overlap in the rules.

According to another aspect of the embodiments, a minimum weight spanning tree can be constructed from the existing rules in a CAM. The weights of the spanning tree can be a "ternary distance." A ternary distance can be the number of bit locations that differ between two rules, where the bit locations do not include an X value. Overlaps between a new rule and existing rules can be determined by comparing rules according to the minimum weight spanning tree.

According to another aspect of the embodiments, as rules are traversed and compared according to minimum weight spanning tree, a bit vector can be maintained that tracks bit location matches between a new rule and the existing rules.

BRIEF DESCRIPTION OF THE DRAWINGS

FIG. 9 is a flow diagram of a fourth embodiment.

FIG. 10 is a pseudocode representation of a fourth embodiment.

FIGS. 13A to 13C illustrate a spanning tree rule comparison operation according to a sixth embodiment.

FIGS. 14A to 14C are diagrams that illustrate a conventional CAM match and update operation.

DETAILED DESCRIPTION OF THE EMBODIMENTS

Various embodiments of the present invention will now be described in conjunction with a number of diagrams. The various embodiments may be best understood by first describing a data structure that may be updated and/or formed according to various embodiments.

Figures 1A, 1B, 2:
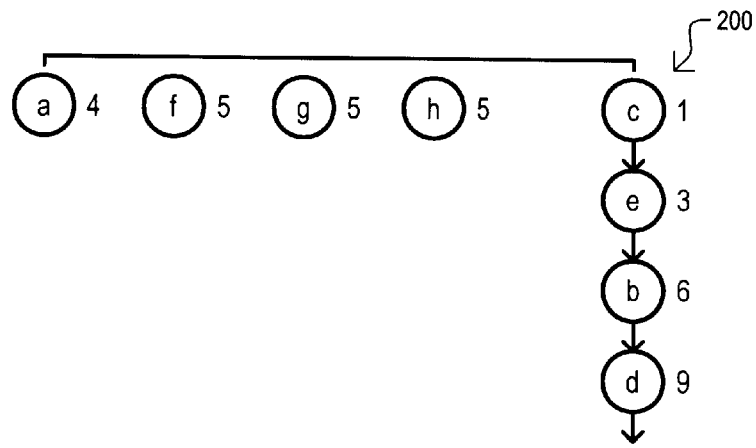
FIGS. 1A and 1B are diagrams illustrating "rules" that may be stored in a ternary CAM.
FIG. 2 is a graph diagram representation of how the rules of FIG. 1A can be arranged in a CAM.

Referring now to FIG. 1A, a number of exemplary rules are set forth. In the particular example of FIG. 1A, each rule includes 32 bit locations, each of which can include a logic "1," a logic "0," or a "don't care" state, shown as an "X." The rules are labeled "a" through "h," and each includes priority value, shown to the right of the entry.

In one very particular arrangement, a rule can include a data value stored in a ternary content addressable memory (CAM) along with its corresponding mask value. FIG. 1B shows a possible data value and mask value combination that can form rule a.

In a match function (i.e., a look-up operation), a query can be applied to the rules to determine if a match exists. One particular example of a query is shown as QUERY in FIG.1A. If a query exists that will match two or more rules, the rules can be considered to "overlap." The particular QUERY in FIG. 1A illustrates an overlap between rules b, c, and e. It is noted that rules b and d also overlap. Further, rules a, g, and h do not overlap with one another or any other rules.

When overlapping rules exist, such rules can be stored at locations within a CAM which establish the desired priority between the overlapping rules. It is noted that by sorting rules into overlapping and non-overlapping rules, non-overlapping rules may be placed at any location within a CAM.

One way to conceptualize a database of rules that are stored within a CAM is in graph algorithm form. It is understood such a representation corresponds to actual match criteria stored in a CAM. In particular, as noted above, a collection of rules can represent data values and corresponding mask values arranged in a particular order within a CAM.

In graph algorithm form, rules can form a "forest" of "graphs." Each rule can be represented by a "node" within a graph. When a rule does not overlap any others, the rule can be a single node group. When rules overlap, such rules can form a multiple node graph connected by "edges." Thus, groups of FIG. 1A can take a graph algorithm form such as that set forth in FIG. 2.

Each rule in FIG. 2 is represented by a circular node. As shown in FIG. 2, because rules a, f g and h do not overlap any other graphs, the rules can be conceptualized as individual graphs of single nodes. However, due to the overlapping arrangement and priorities of rules c, e, b and d, these rules can from a four node graph 200 connected by edges. In CAMs that provide priority according to entry order, the graph 200 can represent the order in which the rules are stored. In particular, the addresses of the rules decrease with each edge (e.g., address c <address e <address b <address d). It is noted that the addresses of graph 200 are preferably not consecutive. It is advantageous to have a number of free locations (i.e., locations that do not store a rule) between each rule of a particular group.

Having described the general concept of rules and rule overlap, a first embodiment will now be described in conjunction with FIG. 3.

Figure 3:
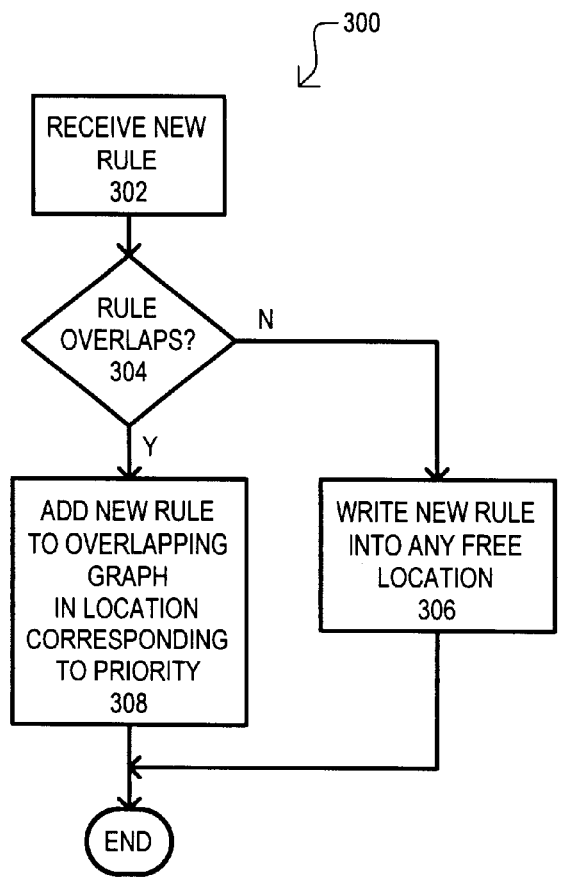
FIG. 3 is a flow diagram illustrating a first embodiment.

FIG. 3 illustrates a method for updating a CAM. The method is designated by the general reference character 300 and can include receiving a new rule (step 302). Such a step may include receiving a rule in the form such as that shown in FIG. 1A. Alternatively, receiving a rule may include manipulating multiple values to arrive at a rule (such as shown in FIG. 1B).

A CAM can include "free" (or available) locations, and "used" or unavailable locations. A free location can be a location that does not store a rule. A used location can be a location that stores a rule. A single "status" (or valid) bit in each CAM entry can indicate free and used locations.

A newly received rule can then be compared to any other rules in a database to determine if there is an overlap (step 304). In the event there is no overlap between the new rule and existing rules, the new rule can be written into a free location (step 306). It is understood that because there is no overlap, the particular priority of the free location within the CAM will not affect the desired matching function of the CAM.

In the event the new rule overlaps one or more rules of an existing graph, the new rule is added to the graph (step 308). As will be described in conjunction with other embodiments, adding a new rule to an existing graph (or graphs) can be as simple as a single write operation, or may involve some manipulation of the various rules within the graph. It is understood however, such a manipulation does not involve moving entire blocks of entries, as is done in a conventional approach.

Further, adding a rule to a graph may physically entail writing a data value and a mask value into a CAM location.

Figures 4A, 4B:
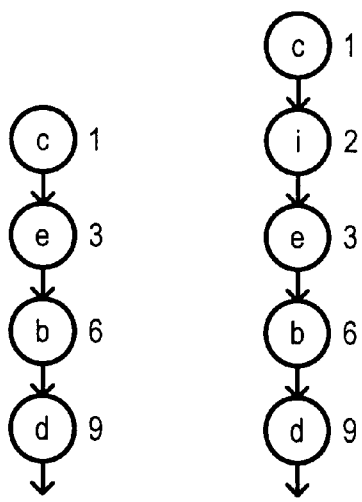
FIGS. 4A and 4B are graph diagrams illustrating the addition of a new rule to an existing graph.

FIGS. 4A and 4B illustrate, in graph algorithm form, the addition of a new rule to a graph according to one embodiment. FIG. 4A shows the multiple node graph 200 of FIG. 2. FIGS. 4A and 4B assume that a new rule i is added. Further, rule i overlaps rules b, c and e, and has a priority of 2. In order to maintain priority, as shown in FIG. 4B, the new rule i is inserted between rules c and e. One skilled in the art would recognize that in a conventional ternary CAM, the arrangement of FIG. 4B can represent the reordering of values such that address c <address i <address e <address b <address d.

Of course, a new rule may be added that has the highest or lowest priority in a graph. If a new rule has a highest priority, the new rule can be written into a location having a lower address value than any other rules in the graph. Similarly, if a new rule has a lowest priority, the new rule can be written into a location having a higher address value than any other rules in the graph.

Figure 5:
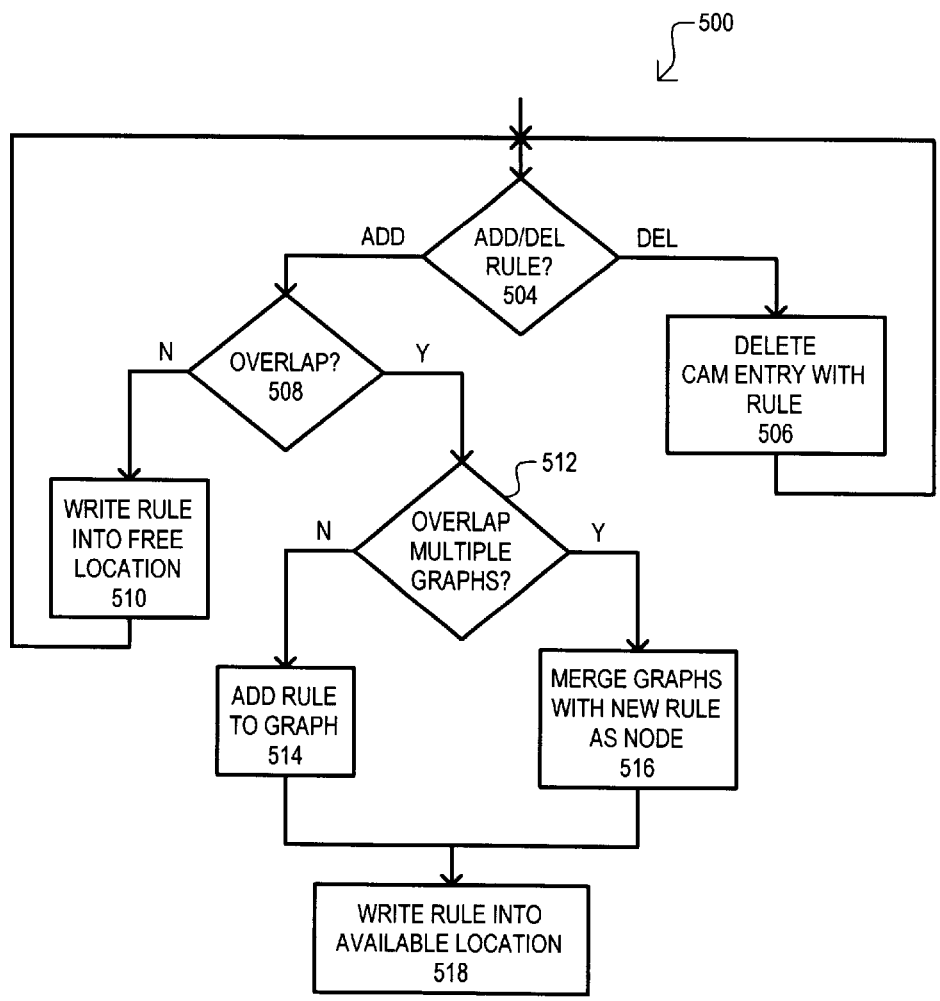
FIG. 5 is a flow diagram of a second embodiment.

Referring now to FIG. 5, a flow diagram is set forth illustrating a second embodiment. The second embodiment is designated by the general reference character 500, and may include adding or deleting a new rule (step 504). If a rule is deleted, the CAM entry containing the rule can have its contents deleted (step 506). In many CAM arrangements, such an operation can involve changing a "status" bit for the CAM entry from a valid state to an invalid state.

If a new rule is to be added, the new rule can be checked with reference to the existing rules stored in a CAM to determine if the new rule overlaps one or more existing rules (step 508).

As in the case of the first embodiment 300, in the event of no overlap, the new rule can be written into a free CAM location (510). In many CAM arrangements, such a CAM location may be randomly selected from those locations having invalid status bits. Once the new rule is written into the location, the status bit may be changed to valid. Further, the writing of a rule can include writing a data value and its corresponding mask value to a CAM location.

In the event the new rule overlaps one or more existing rules, how the method proceeds can continue according to whether the new rule overlaps rules in multiple graphs or not (step 512). In the event there is no multiple graph overlap, the new rule can be added to the graph (step 514). Such a step may be similar to step 308 in FIG. 3.

In the event there is an overlap with multiple graphs, the multiple graphs can be merged into a single graph that now include the new rule (step 516).

The addition of new rule to an existing graph (steps 514 and 516) can result in the new rule being written into an available CAM location (step 518). Such a step 518 can include writing a new overlapping rule (e.g., a new graph node) into available CAM locations according to a particular graph order. As just one example, a rule may be written so that graph node values (i.e., rules) correspond to locations of increasing address value and decreasing priority. A particular approach to adding a new rule to an existing graph will be described in more detail with reference to FIG. 9.

Figure 6A:
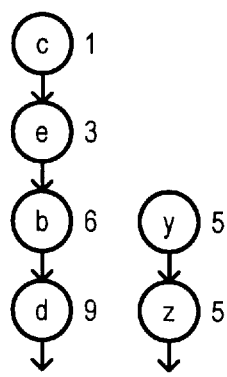
FIGS. 6A and 6B are graph diagrams illustrating the merging of two graphs resulting from a new rule that overlaps two existing graphs.
Figure 6B:
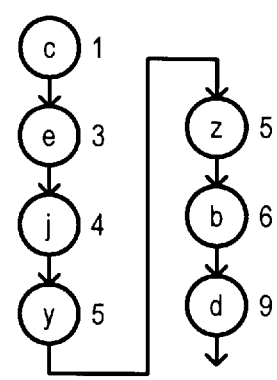

FIGS. 6A and 6B illustrate, in graphic algorithm form, the addition of a new rule that results in the merging of two graphs. FIG. 6A illustrates two graphs, one that includes rules c, e, b and d, and one that includes rules y and z. The priorities of each rule are shown as a number next to the rule's node. In the example of FIGS. 6A and 6B, it is assumed that a new rule j is added. Rule j has a priority of 4, and overlaps rules c, e, b and d. Further, Rule j also overlaps rule y. The two existing graphs are merged to include new rule j and form a new graph, shown in FIG. 6B.

Figures 7, 8:
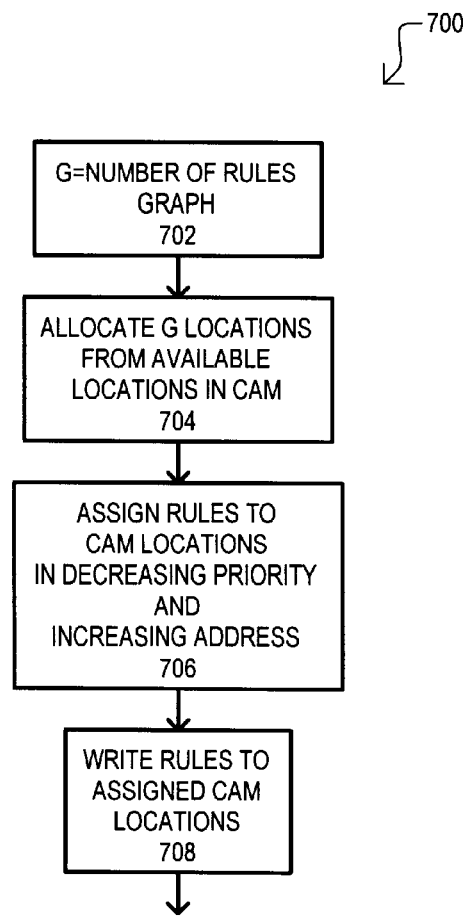
FIG. 7 is a flow diagram of a third embodiment.
FIG. 8 is a pseudocode representation of a third embodiment.

Referring now to FIG. 7, a flow diagram is set forth illustrating a method for modifying a CAM for a new graph according to a third embodiment. The method may be used to add a new rule to a group, such as in step 308 of FIG. 3 and steps 514, 516 and 502.

The method of FIG. 7 is designated by the general reference character 700 and may include determining the number of rules (G) in a graph (step 702). Where a new rule is being added to an existing graph, the number G can include the new rule. The method can then allocate G entries that are randomly selected from all available entries in a CAM (step 704). Having allocated a CAM entry for each rule, the rules of the graph can be assigned to a corresponding CAM location (step 706). Such a step can include arranging the rules in an order according to priority. The rules can then be assigned in the order to addresses of increasing value. Each rule may then be written to its assigned CAM location (step 708).

FIG. 8 sets forth the method of FIG. 7 in "pseudocode." Pseudocode" can be a broad way of expressing a method. The pseudocode method may be easily implemented into particular computer language code versions for use in a system employing a general processor. In addition, the described algorithm can be implemented in a higher level hardware designing language, to enable the preferred embodiment to be realized as an integrated circuit (IC) or a portion of an IC. Pseudocode is widely used in industry and textbooks to express methods, and would be understood by one skilled in the arts of computer systems and/or hardware designing arts.

Referring now to FIG. 9, a flow diagram is set forth illustrating a method for modifying an existing graph according to a fourth embodiment. The method may be used to add a rule to a graph such as in step 308 of FIG. 3 and steps 514, 516, 502 of FIG. 5.

The method of FIG. 9 is designated by the general reference character 900 can may include determining the CAM location of the preceding rule (Aprec) and succeeding rule (Asuc) with respect to a new rule (step 902). In the example of FIGS. 4A and 4B, the Aprec for rule i is rule c. The Asuc for rule i is rule e.

Once Aprec and Asuc locations are determined, the CAM locations between Aprec and Asuc can be examined for any free locations (step 904). If any such free location exists, the new rule is written into such a location (step 906). It is noted that such a step can include a single access to a CAM. This is in contrast to conventional approaches that can require many accesses to a CAM as blocks of values are shifted to lower addresses.

If there are no free locations between Aprec and Asuc, those locations containing the rules of the graph are deleted (step 908). A new graph can then be written into the CAM that includes the new rule (step 910). In one particular embodiment, step 910 can include a method, such as that set forth in FIG. 7.

FIG. 10 sets forth a pseudocode representation of the method set forth in FIG. 9.

Figures 11, 12:
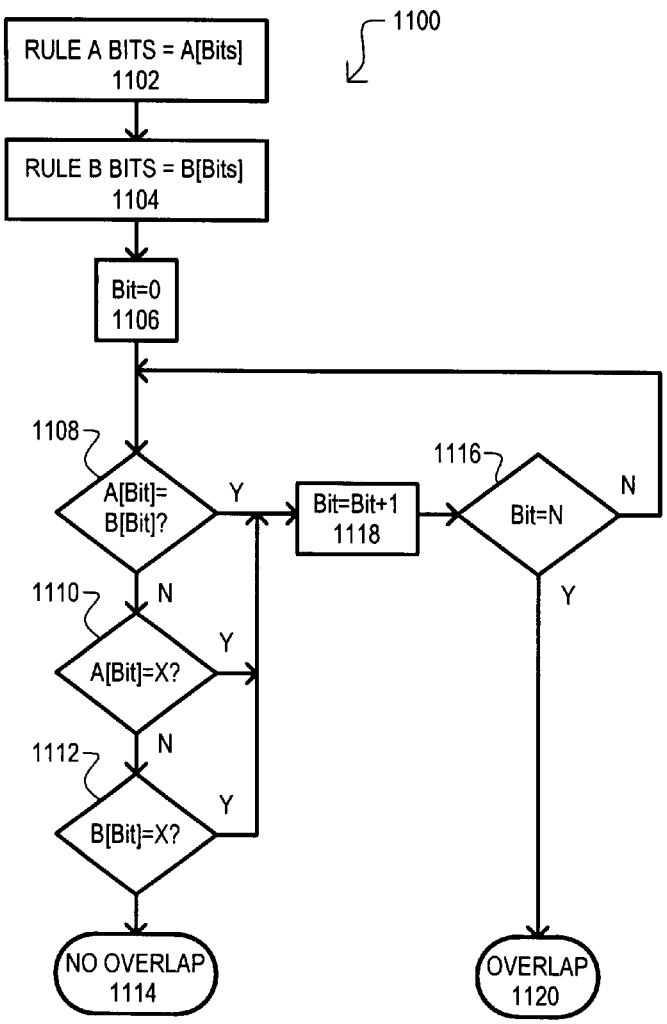
FIG. 11 is a flow diagram of a fifth embodiment.
FIG. 12 is a pseudocode representation of the fifth embodiment.

Referring now to FIG. 11, a flow diagram is set forth illustrating a method for determining if two rules overlap one another according to a fifth embodiment. The method may be used in a step such as 304 in FIG. 3 and/or step 508 in FIG. 5.

The method of FIG. 11 is designated by the general reference character 1100 and may include establishing bit locations for a first rule (step 1102) and a second rule (step 1104). In the particular example of FIG. 11, a rule "A" can be compared to another rule "B." A particular rule bit location value can be given as A[Bits] or B[Bits]. It is assumed that rules A and B have a bit length of N. The method 1100 can begin comparing two rules at one "end." In the arrangement of FIG. 11, this can be accomplished by setting Bit=0 (step 1106).

Corresponding bit locations in the two rules can then be compared. Such a bit-by-bit comparison can include checking to see if the two rule bit values are the same (e.g., 1 and 1, 0 and 0, or X and X) (step 1108). If the corresponding bit values are different, the bit values are checked to see if one of the bit values is "X" (e.g., don't care) (steps 1110 and 1112). If the corresponding bit values are different and neither is an X, a "no overlap" determination can be made (step 1114).

As shown in FIG. 11, if the corresponding bit locations of the rules are the same, or one of the locations is an X, the current bit location can be incremented (step 1118). The current bit location can then be checked to see if it is the last bit location (step 1116). If the current bit location is not the last location, the next bit location can be checked. If the current bit location is the last location, an "overlap" determination can be made (step 1120).

FIG. 12 sets forth a pseudocode representation of the method set forth in FIG. 11.

While the fourth embodiment of FIG. 11 sets forth one method for determining an overlap between two rules, such an approach may take considerable time for a large number of rules. In particular, if each rule include N bit locations and there are W rules, checking for an overlap could potentially require a number operations proportional to N×W.

One way to reduce the number of operations involved in checking for overlaps can be to utilize an auxiliary data structure. One such structure can include a "minimum weight spanning tree," where each vertex of the spanning tree represents a particular rule. The weights of the spanning tree can be a "ternary distance" between rules. A ternary distance can be the number of bit positions that are different between two rules where neither of the bit positions is an X. In this way, rather than compare all bit values between rules, as a new rule is compared with rules according to the spanning tree, only bit locations that differ between consecutive rules of the tree are compared.

The use of a minimum weight spanning tree may best be understood by example. Referring now to FIG. 13A, a table is set forth illustrating four rules and a "difference vector" corresponding to each rule. The rules are 8-bit rules and are arranged in the order of a minimum weight spanning tree. That is, a ternary distance weight was determined between each rule and every other rule. From these weight values, a minimum weight spanning tree was derived resulting in the rule order of FIGS. 13A to 13C.

Minimum weight spanning trees are well understood in the art. Various algorithms can be utilized to generate a minimum weight spanning tree. As but two examples, Kruskal's algorithm or Prim's algorithm can be used to determine a minimum weight spanning tree.

The "difference vectors" are shown in the column labeled DIFFERENCE. A difference vector can indicate differences in bit values between one rule and the previous rule in the spanning tree. In the particular example of FIGS. 13A to 13C, each difference vector includes bit locations that can store a "0," that indicates no difference between a rule and the previous rule, or a "1," that indicates a difference between a rule and the previous rule.

In FIGS. 13A to 13C, because no rule precedes rule 1, the bits of the difference vector associated with rule 1 are all 1s. As will be described below, the use of difference vectors can provide for faster overlap determinations.

One way to search according to the spanning tree (i.e., traverse the spanning tree) is to maintain a "match vector." A match vector can maintain an indication of which bit locations of a new rule overlap those of an existing rule. Such a bit overlap can occur if the bit values are the same, or one of the bit values is an X.

FIG. 13B illustrates an operation where a new rule (rule x) is checked for overlap against the existing rules. The resulting running match vector is shown in FIG. 13B in column MATCH. The first difference vector (1111 1111) indicates that initially, all bit values of the new rule are compared to those of rule 1. However, the next difference vector indicates that only the last bit of the new rule is compared to rule 1. In this way, compare operations can be faster than the previously described methods. Because the new rule doesn't overlap any of the existing rules, the entire spanning is traversed without the match vector indicating an overlap (e.g., a value of 1111 1111).

FIG. 13C illustrates an operation where a different new rule (rule y) is checked for overlap against the existing rules. (It is assumed that rule x was not added to the CAM). As shown by the resulting running match vector having a value of 1111 1111, the new rule y overlaps rule 4 of the spanning tree.

It is noted that while a method according to the present invention can write the rules of an overlapping group (i.e., the rules of a graph as shown in the various figures) to "random" available locations, such a step does not necessarily include a random number generator or the like. Such a step can preferably write rules so that empty locations can be situated between other rules of the graph, thus allowing for rapid updates to the graph.

It is also noted that a "graph" can be a list that is maintained in a memory of the overlapping rules of the graph. Such a list may include the locations and priority of each rule. In addition, such a list may also include all of the rules, but include a field associated with each rule that indicates the particular graph that a rule may belong to.

Finally, while the preferred embodiments set forth herein have been described in detail, it is be understood that the present invention could be subject various changes, substitutions, and alterations without departing from the spirit and scope of the invention. Accordingly, the present invention is intended to be limited only as defined by the appended claims.

What is claimed is:

1. In a content addressable memory (CAM) that can receive an input query and provide a match indication between an input query and stored rules, the CAM including a plurality of storage locations that can each store a rule that includes maskable matching criteria, the storage locations having an order that can establish priority among multiple rules, a method of adding new rules to the CAM, comprising the steps of:

determining if a new rule, having a predetermined priority with respect to the stored rules, overlaps any stored rule, wherein a new rule overlaps a stored rule if a query exists that matches the new rule and the stored rule;

if a new rule overlaps a rule in a group of overlapping stored rules, determining a closest lower priority rule that is the rule in the overlapping group that has the closest lower priority with respect to the new rule priority, determining a closest higher priority rule that is the rule in the overlapping group that has the closest higher priority with respect to the new rule priority, if an empty location exists between the locations of the closest lower priority rule and the closest higher priority rule, writing the new rule into the empty location, and if no empty location exists between the location of the closest lower priority rule and the closest higher priority rule, selecting a new group of locations from all current empty locations and all locations of the overlapping group, the new group of locations including a location corresponding to each rule of the overlapping group and the new rule, and writing the group of overlapping rules and the new rule into the new group of locations in order of priority.

2. The method of claim 1, wherein:

each rule includes bit locations that store a 0 value, a 1 value, or a masked value; and determining if a new rule overlaps any stored rule includes comparing corresponding bits locations of the new rule and stored rule and indicating a rule overlap if all corresponding bit locations store the same value or where bit locations store different value, one of the bit values is a masked value.

3. The method of claim 2, wherein:

comparing corresponding bits locations of the new rule and a stored rule includes sequentially comparing corresponding bit locations of the new rule and stored rule an indicating no rule overlap if a corresponding bit location stores different values, and neither of the value is a masked value.

4. The method of claim 1, further including:

each rule having bit locations that store a 0 value, a 1 value, or a masked value;

forming a minimum weight spanning tree from the rules stored in the CAM, the weights of the spanning tree corresponding to the number of corresponding bit locations between a stored rule and another stored rule that differ from one another and neither bit location is a masked value.

5. The method of claim 4, further including:

forming a difference vector for each value in the minimum weight spanning tree, the difference vector indicating corresponding bit locations between a stored rule and a previous rule that differ from one another and neither is a masked value.

6. The method of claim 1, further including:

the step of selecting a new group of locations includes selecting random locations from the set of locations that include all current empty locations and all locations of the overlapping group.

7. The method of claim 1, further including:

the step of writing the group of overlapping rules and the new rule into the new group of locations includes assigning the new rule and the rules of the overlapping group to locations in the new group in decreasing priority and increasing address.

8. The method of claim 1, wherein:

each rule includes a binary data value and a corresponding binary mask value.

9. In a ternary content addressable memory (CAM) that can provide a match indication between an input query and a number of entries, the CAM having a plurality of locations arranged in an order that determines priority among the locations, an unavailable location being a location that stores an entry having match criteria, an available location being a location that does not store an entry, a method of managing entries in the ternary CAM, the method comprising the steps of:

checking a new entry for overlap with any existing entries;

storing a non-overlapping new entry in an available location;

storing an overlapping new entry in an available location between the locations of existing overlapping entries of higher priority and the locations of existing overlapping entries of lower priority, if such an available location exits, and if such an available location does not exist, storing the overlapping new entry and the overlapping entries into new available locations in the CAM order according to the priority of each entry, the new available locations including all available locations and the locations of the overlapping entries; wherein overlapping entries are entries that include match criteria that can all match one query.

10. The method of claim 9, wherein:

each entry includes bit locations that can have a predetermined logic value or a "don't care" value; and checking a new entry for overlap includes comparing bit locations of the new entry to corresponding bit locations of existing entries.

11. The method of claim 10, wherein:

each entry includes a data value and mask value corresponding to each bit location, a bit location having the predetermined logic value of the data value if the corresponding mask value has a first value, a bit location having a don't care value if the corresponding mask value has a second value.

12. The method of claim 9, wherein:

storing the overlapping new entry and the overlapping entries includes selecting from the new available locations at random.

13. The system of claim 9, further including:

maintaining a list of entry groups, the lists of entry groups including single node lists for non-overlapping entries and multiple node lists for overlapping entries, the lists including the locations and priority order of the overlapping entries.

14. The system of claim 9, further including:

maintaining a spanning tree list of all entries; and checking a new entry for overlap with any existing entries includes comparing the new entry to existing entries according to the spanning tree.

15. The system of claim 14, wherein:

each entry includes bit locations that can have a predetermined logic value or a "don't care" value; and the spanning tree is a minimum weight spanning tree, the weights for existing entries being the number of bits that are different from corresponding bits of other existing entries where neither entry bit is a "don't care" value.

16. A method of maintaining entries in a ternary content addressable memory (CAM) that provides priority according to a location order, the method comprising the steps of:

a) selecting n available locations in the CAM, where n is the number of entries of an entry group, where each entry in the group has a predetermined priority and can match the same input value;

b) storing the n entries of the group into the n locations in a location order that corresponds to the priorities of the entries;

c) receiving an update entry having a predetermined priority value, and determining if the update entry overlaps any other entries, where one entry overlaps another entry when both entries can both match the same CAM input value;

d) determining if an available location exists between the locations of overlapping entries having a higher priority value than the update entry and the locations of overlapping entries having a lower priority value than the update entry;

e) storing the update entry in the available location of step d) if such a location exists; and f) repeating steps a) and b) with the entry group that includes the update entry and any other entry that overlaps the update entry, if the available location of step d) does not exist.

17. The method of claim 16, further including:

step c1) determining if the update entry overlaps more than one group of entries, where the groups of entries do not overlap with one another;

step c2) repeating steps a) and b) with an entry group that includes the update entry and all other entries that overlap with the update entry.

18. The method of claim 16, further including:

step c1) determining if the update entry overlaps more than one group of entries, where the groups of entries do not overlap with one another.

19. The method of claim 16, wherein:

each location has a corresponding address; and step b) includes storing entries of decreasing priority in locations of increasing addresses.

20. The method of claim 16, wherein:

step g) includes deleting a entry by changing the location of the entry from an unavailable entry to an available entry.

21. A method of updating a content addressable memory, comprising:

determining that a new rule to be added to the content addressable memory overlaps a first rule of a graph group; and writing the new rule in a free location or a location previously occupied by a rule in the graph group based on priorities of the new rule and the first rule.

22. The method of claim 21, further including:

determining whether the new rule overlaps multiple graphs; and merging the multiple graphs when the new rule overlaps multiple graphs.

23. The method of claim 21, wherein the first rule is a member of a graph of rules, and the writing includes:

writing the new rule and the members of the graph of rules in priority order in a set of memory locations including locations previously occupied by members of the graph and a free location.

24. The method of claim 21, wherein the first rule is a member of a graph of rules, and further including:

determining a priority of the new rule relative to the members of the graph of rules;

determining whether a free location exists in the content addressable memory that is consistent with the priority of the new rule relative to the locations of the members of the graph;

if a free location exists that is consistent with the priority of the new rule relative to the locations of the members of the graph, writing the new rule at the free location; and if a free location that is consistent with the priority of the new rule relative to the locations of the members of the graph does not exist, relocating rules of the graph to locations in the content addressable memory to the extent necessary to write the new rule in a location that is consistent with the priority of the new rule relative to the locations of the members of the graph.

* * * * *